United States Patent Office 2,866,773
Patented Dec. 30, 1958

2,866,773

PRODUCTION OF INORGANIC POLYMERIC SUBSTANCES

Cyril Aubrey Redfarn, London, England, assignor to Walker Extract and Chemical Company Limited, Bolton, England, a British company No Drawing. Application July 11, 1955
Serial No. 521,408

Claims priority, application Great Britain July 14, 1954

19 Claims. (Cl. 260—47)

This invention is for improvements in or relating to the production of polymeric substances containing a high proportion of phosphorus and nitrogen and has for an object to provide new polymeric substances which may be useful as plasticisers for phenolic resins, as bonding agents, adhesives, moulding materials, frictional materials, abrasive elements, surface-coating and impregnating compositions and fire-proofing compositions.

In "Structural Chemistry of Inorganic Compounds" by W. Hükel, 1951, volume II, chapter IX, part 2, section 6, a summary is given of various investigations concerning the formation of polyphosphochloronitrides $(PNCl_2)_n$, hereinafter referred to, in accordance with the currently used terminology, as polyphosphonitrilic chlorides, by the reaction of ammonium chloride with phosphorus pentachloride. These polyphosphonitrilic chlorides are crystals, liquids or rubber-like products which are water-insoluble and do not decompose by pyrolysis up to 450° C. Polymers can be prepared by heating 5.3 g. dry ammonium chloride with 20.8 g. phosphorus pentachloride in 100 cc. of tetrachloroethane under reflux until no further hydrogen chloride is evolved (about 1½ hours). Unchanged ammonium chloride is filtered off and the solvent distilled off leaving the polymeric material. Re-crystallisation from dichloroethane gives softish crystals of $(PNCl_2)_n$ where $n=3$ or 4. Heating the crystals in a vessel at 360° C. brings about steady polymerisation until, in about 30 minutes, a rubbery material is obtained passing through an oily stage.

This product is water-insoluble and fire-resistant. The structure of the polymers is given as:

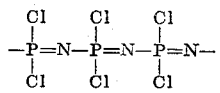

."Mixed polyphosphonitrilic chlorides" means a mixture of polyphosphonitrilic chlorides prepared according to the method of R. Schenck and G. Römer (Berichto, vol. 57, p. 1343 (1924)). The tri-phosphonitrilic chloride and tetraphosphonitrilic chloride were prepared by extracting the mixture of polyphosphonitrilic chlorides prepared in this way with light petrol boiling between 40° C. and 60° C. The extract, from which the solvent had been removed by evaporation, was filtered. The residue, consisting of crystalline triphosphonitrilic chloride and tetraphosphonitrilic chloride together with a little oil, was subjected to fractional distillation at a pressure of 13 mm. mercury. The triphosphonitrilic chloride was collected as a fraction boiling at 127° C., and the tetraphosphonitrilic chloride as a fraction boiling at 188° C.

So far, all of this is known. The present invention is based on the theory that useful products should be obtainable by reacting the chlorine groups in the polymer with polyhydric compounds.

According to the present invention there is provided a process for the production of modified inorganic polymeric substances which comprises heating a polyphosphonitrilic chloride preferably of low molecular weight under substantially anhydrous conditions with a polyhydroxy aromatic compound; the polyhydroxy aromatic compound may be a partial ester with boric acid, with an inorganic phosphoric acid or a polyfunctional chlorine derivative thereof, or with phosphorus trichloride, of a polyhydroxy aromatic compound which partial ester molecule contains free phenolic hydroxy groups and which may be formed in situ.

The present invention is principally directed to the treatment of the lower molecular weight polymers which are still either crystalline or liquid in character and, according to a feature of the invention, a crystalline or oily polyphosphonitrilic chloride is reacted with more than 75% of its weight of a dihydroxy benzene, preferably with at least equal parts by weight thereof. It will be appreciated that when other dihydroxy or polyhydroxy aromatic compounds are used in place of dihydroxy benzene, the weights taken should be such that the amount of hydroxy group is the same as that afforded by the dihydroxy benzene. During the reaction there is an evolution of hydrogen chloride and the reaction product, when it is such that the aromatic nucleus contains an unsubstituted position reactive with formaldehyde, is reactive with formaldehyde or hexamethylene-tetramine or other like cross-linking agent to produce a somewhat flexible cured resin containing methylene bridges as in phenolic resins. It is preferred that the reaction is not taken to completion and it is believed that, in these circumstances substantially only one of the hydroxy groups on the dihydroxy aromatic compound reacts with the chlorine atoms in the polymer resulting in a product having hydroxy aromatic substituents on the polymer chain; these hydroxy aromatic substituents are formaldehyde reactive. The formaldehyde reactive products are more readily obtained when using about equal parts of the polymer and the dihydroxy aromatic compound.

The invention also includes a further reaction of the modified polymeric product above described with a reactive aldehyde preferably a lower aliphatic aldehyde containing not more than four carbon atoms or a compound decomposable thereto under the influence of heat; these compounds may be formaldehyde or acetaldehyde or polymers thereof, such as paraformaldehyde, the material hexamethylenetetramine which is a common formaldehyde donor, or trishydroxymethyl phosphine oxide, which also behaves like a formaldehyde donor; it will be appreciated that it is those modified products obtained by the use of more than 75% by weight (based on the weight of the polyphosphonitrilic chloride) of a dihydroxy aromatic compound which are readily capable of further reaction with an aldehyde.

It is found that, if the amount of the dihydroxy aromatic compound is reduced below approximately equal parts by weight of the reactants down to 50%, or less, by weight of the polyphosphonitrilic chloride, the reaction can readily be taken to completion to produce modified polyphosphonitrilic chlorides which are non-reactive towards formaldehyde.

According to a feature of the invention, less than 75%, preferably not less than 50%, by weight (based on the weight of the polyphosphonitrilic chloride) of a dihydroxy aromatic compound is reacted to completion with the crystalline or oily polyphosphonitrilic chlorides.

It is believed that in these latter products both the hydroxy groups on the dihydroxy aromatic compound react, effecting cross linking between adjacent polymer chains, which chains are therefore linked by aromatic linkages which contain no position which is reactive to formaldehyde and these linkages therefore do not react with formaldehyde to form methylene bridges.

It has been further found possible to effect an intramolecular plasticisation of the modified polymeric product by introducing a proportion of a mono-hydroxy aromatic compound into the reaction mixture so that some of the chlorine groups on the polyphosphonitrilic chloride chain are replaced by non-hydroxylated aromatic groups. Thus, a further feature of the invention consists in that a monohydroxy aromatic compound is used in place of a part of the polyhydroxy aromatic compound.

Intermolecular plasticisers, such as the triarylphosphates, may also be admixed with the reaction product.

Various polyhydroxy aromatic compounds may be used in carrying out the present invention and, amongst them, may be mentioned resorcinol, hydroquinone, toluhydroquinone, diphenylolpropane, phloroglucinol and pyrogallic acid; it will also be appreciated that a mixture of polyhydroxy aromatic compounds or of the above mentioned partial esters thereof may be employed and further that a mixture of the said compounds and the said partial esters thereof may be employed.

The inorganic phosphoric acids used in the manufacture of the partial esters of the polyhydroxy aromatic compounds include the ortho-, meta- and poly-phosphoric acids and cyclic meta-phosphoric acids and the polyfunctional chlorine derivatives thereof include phosphorus pentachloride and phosphorus oxychloride.

For a fuller description of the inorganic acid, partial esters of the polyhydroxy aromatic compounds, reference is made to copending Application No. 504,860, filed on April 28, 1955, now Patent No. 2,825,768.

The following examples, in which the parts and percentages quoted are calculated by weight, illustrate the manner in which the invention may be carried into effect:

Example 1

20 g. of the oily polymer of phosphonitrilic chloride were mixed with 20 g. of hydroquinone and the mixture was heated at 180–190° C. for a period of 50 minutes. During this time there was an evolution of hydrogen chloride yielding a product which was rubbery when hot but which on cooling became a hard solid. This product is heat-reactive with hexamethylenetetramine to produce a thermoset resin. When using about 10% by weight of hexamethylenetetramine the cured resin is somewhat flexible.

Example 2

20 grams of the oily polymer of phosphonitrilic chloride were admixed with 10 g. of resorcinol and the mixture was heated at 180–190° C. for 1 hour. The product was on infusible resin and is believed to be a substantially fully cross-linked product in which two chains of the phosphonitrilic chloride polymer are interlinked through the dihydroxyphenolic nucleus.

Example 3

A reaction mixture was prepared as follows:

| | Parts |
|---|---|
| Hydroquinone | 100 |
| Mixed polyphosphonitrilic chlorides | 100 |

The polyphosphonitrilic chlorides were liquified at 100° C. and the hydroquinone added slowly with continuous stirring. The heating was then carried out in an oil bath at 180 to 185° C. for 50 minutes. The product after cooling was a hard brown solid which was ground to a powder for moulding purposes.

The resin set to a brown solid when heated at 200° C. for 2¼ minutes. When mixed with 10% hexamethylenetetramine, the resin set to a hard powder when heated at 200° C. for 1 minutes 12 seconds.

Example 4

A reaction mixture was prepared as follows:

| | Parts |
|---|---|
| Resorcinol | 150 |
| Mixed polyphosphonitrilic chlorides | 150 |

The resorcinol was added to the liquified polyphosphonitrilic chloride and the mixture heated to reflux for 15 minutes. The temperature rose to 160° C. during this period and heating was continued for ½ hour at 160 to 170° C. The product was a dark-red liquid when hot and upon cooling became a dark red crumbly solid. The resin thermoset to a soft rubber when heated at 200° C. for 2¼ minutes.

When mixed with 10% paraformaldehyde and heated at 150° C. for 20 seconds the resin set to a red-brown solid.

Example 5

A reaction mixture was prepared as follows:

| | Parts |
|---|---|
| Diphenylol propane | 228 |
| Mixed polyphosphonitrilic chlorides | 110 |

The diphenylol propane was mixed thoroughly with the melted polyphosphonitrilic chlorides and heated to reflux for 35 minutes. The temperature was raised to 180 to 185° C. for 60 minutes when a hard translucent brown resin was obtained.

The resin thermoset to a soft rubbery solid when heated at 150° C. for 3½ minutes.

When mixed with 10% hexamethylenetetramine, the resin set to a rubbery solid after 24 seconds at 150° C. and in 3½ minutes at 100° C.

Example 6

A reaction mixture was prepared as follows:

| | Parts |
|---|---|
| Diphenylol propane | 114 |
| Mixed polyphosphonitrile chlorides | 110 |

The mixture was refluxed for 30 minutes. The product in this case was a soft brown resin which thermoset to a hard solid in 2¾ minutes when heated at 200° C.

Example 7

A resin was prepared by heating together 11 g. of hydroquninone with 11 g. of resorcinol and 18.6 g. of boric acid to a final temperature of 280° C. under a short reflux condenser which allowed water to escape but condensed the phenolic substances.

The oily polymer of the phosphonitrilic chloride was dispersed on china clay and the china clay carrying the oily polymer was then intimately mixed with an equal weight of the resin and the mixture was then subjected to heat-curing in the presence of approximately one molecular equivalent of hexamethylenetetramine, with respect to the resin, at a temperature of 300° C. During the heat-curing it appeared that the hydroxy groups of the resin or the amino groups present in the hexamethyleneteramine in the reaction mixture reacted with the chloro-groups in the phosphonitrilic chloride, resulting in a hard, infusible final resin.

Example 8

A resin was prepared by heating together 2 molecular proportions of phosphorus oxychloride and 3 molecular proportions of hydroquinone at 160 to 170° C. for 50 minutes. The resinous product was cooled to 120° C. and 100 parts added to 50 parts of liquified mixed polyphosphonitrilic chlorides. The mixture was heated to 150° C. for 20 minutes when it became very viscous and rubbery. On cooling, the product was a fawn-coloured hard solid which thermoset to a soft rubber when heated at 150° C. for 2¾ minutes.

When mixed with 10% paraformaldehyde, the resin set to a rubbery solid at 150° C. in 1 minute 45 seconds.

Example 9

A reaction mixture was prepared as follows:

| | Parts |
|---|---|
| Hydroquinone | 110 |
| Tri-phosphonitrilic chloride $(PNCl_2)_3$ | 110 |

The hydroquinone was liquified at 170° C. and the triphosphonitrilic chloride was added in small quantities over a period of 10 minutes. A vigorous reaction took place and the heating temperature was gradually raised to 190° C. for 20 minutes. After a further period of 45 minutes at 190° C. the grey semi-solid product was cooled and ground to a fawn-coloured powder.

This resin when mixed with 10% hexamethylenetetramine and heated at 200° C. for 35 seconds set to a stiff rubbery solid whereas the resin obtained in Example 3 from the mixed polyphosphonitrilic chlorides took 1 minute 12 seconds to set to a hard powder at the same temperature.

*Example 10*

A reaction mixture was prepared as in Example 9, except that the triphosphonitrilic chloride was replaced by the tetramer. The reaction with the hydroquinone was much less vigorous than with the trimericphosphonitrilic chloride and the product was a greyish-brown powder when finely ground.

This resin thermoset to a stiff rubbery solid when mixed with 10% hexamethylenetetramine and heated at 200° C. for 25 seconds.

*Example 11*

A reaction mixture was prepared as in Example 9, but in this case the tri-phosphonitrilic chloride was replaced by an equal weight of oily phosphonitrilic chloride polymer. The product was a dark-brown solid which set to a rubbery solid when ground with 10% hexamethylenetetramine and heated at 200° C. for 55 seconds.

*Example 12*

A reaction mixture was prepared as follows:

| | Parts |
|---|---|
| Phloroglucinol | 126 |
| Phenol | 94 |
| Mixed polyphosphonitrilic chlorides | 110 |

The phenol and polyphosphonitrilic chlorides were melted at 100° C. and the phloroglucinol added slowly, while the temperature was raised to 140° C. A vigorous reaction took place and heating was continued at 140° C. for 1 hour. The reaction mixture became solid and, on cooling, was ground to a fine brown powder.

The powder thermoset to a dark solid on heating at 200° C. for 2¼ minutes. When mixed with 10% hexamethylenetetramine and heated at 200° C., the resin set to a hard solid in 15 seconds.

*Example 13*

A reaction mixture was prepared as follows:

| | Parts |
|---|---|
| Resorcinol | 165 |
| Phenol | 94 |
| Mixed polyphosphonitrilic chlorides | 220 |

The phenol and polyphosphonitrilic chlorides were melted and the resorcinol was added slowly to this mixture with continuous stirring. The reaction temperature was raised to 180° C. for 1½ hours after which the product was given a further 1½ hours at 160° C. A soft, dark-brown solid was obtained which thermoset to a dark rubbery solid when heated at 150° C. for 2 minutes.

When mixed with 10% hexamethylenetetramine, the resin set at 100° C. in 2 minutes to a black rubbery solid.

*Example 14*

A reaction mixture was prepared as follows:

| | Parts |
|---|---|
| Pyrogallic acid | 84 |
| Mixed polyphosphonitrilic chlorides | 110 |

The ingredients were mixed together and heated at 140° C. for 1 hour. When cold the product was a hard, red-coloured resin which thermoset to a black rubbery solid on heating at 200° C. for 3 minutes.

When mixed with 10% hexamethylenetetramine, the resin set to a fawn-coloured solid on heating to 200° C. for 15 seconds.

*Example 15*

A reaction mixture was prepared as follows:

| | Parts |
|---|---|
| Tolu-hydroquinone | 124 |
| Mixed polyphosphonitrilic chlorides | 110 |

The tolu-hydroquinone was added slowly to the melted polyphosphonitrilic chlorides. Heating of the mixture was carried out at 160 to 165° C. for ½ hour. The product was a brown solid which thermoset to a black rubbery solid on heating at 150° C. for 3½ minutes.

When mixed with 10% hexamethylenetetramine, the resin set to a hard solid in 1 minute 50 seconds at 150° C.

*Example 16*

A reaction mixture was made as follows:

| | Parts |
|---|---|
| Di-o-cresylol propane | 256 |
| Mixed polyphosphonitrilic chlorides | 110 |

The dicresylol propane was added slowly to the melted polyphosphonitrilic chlorides (100° C.). The mixture was heated to 140° C. over a period of ½ hour and then the temperature was raised to 160° C. over a period of ¾ hour. After a further hour at 160° C. the product was cooled. A soft, amber-coloured resin was obtained which thermoset to a rubbery solid at 200° C. in 3½ minutes. When mixed with 10% hexamethylenetetramine the resin set to a greenish-coloured, rubbery solid in 20 seconds.

*Example 17*

A reaction mixture was prepared as follows:

| | Parts |
|---|---|
| Catechol | 110 |
| Mixed polyphosphonitrilic chlorides | 110 |
| Tetrachloroethane | 110 |

The polyphosphonitrilic chlorides were dissolved in the tetrachlorethane by warming on a water bath at 100° C. The catechol was then added and the mixture was heated to reflux at 160 to 170° C. for 1 hour. A fawn-coloured solid separated out and, after cooling to 20° C., the mixture was filtered. The solid obtained was washed with tetrachlorethane and dried at 50° C. for 1 hour.

When the product was heated at 150° C. for 50 seconds it thermoset to a hard grey solid, and when mixed with 10% hexamethylenetetramine it set to a hard black solid after heating at 100° C. for 1½ minutes.

*Example 18*

A reaction mixture was prepared as follows:

| | Parts |
|---|---|
| Phloroglucinol | 42 |
| Mixed polyphosphonitrilic chlorides | 55 |
| Methyl ethyl ketone | 110 |

The phloroglucinol was dissolved in half the total quantity of the solvent and the polyphosphonitrilic chlorides were dissolved in the other half. The two solutions were then mixed and heated on a water bath at 100° C. for 1 hour. The solution became dark-red and a layer of resinous syrup separated out. The dark resin was separated from the solvent and dried for 3 hours at 50° C.

One half of the product was further freed from solvent by drying for 1 hour at 50° C. under reduced pressure (25 mm. of mercury).

Both products thermoset when heated at 200° C. for 6 minutes, and when mixed with 10% hexamethylenetetramine an orange coloured solid was obtained in each case after heating at 150° C. for 20 seconds.

Example 19

A reaction mixture was made up as follows:

| | Parts |
|---|---|
| Phenol (M. P. 40–41° C.) | 188 |
| Hydroquinone | 330 |
| Mixed polyphosphonitrilic chlorides | 440 |

The phenol and hydroquinone were melted together at 160° C. The polyphosphonitrilic chlorides were melted at 100° C. and added to the mixed hydroxy phenols. The mixture was heated for 30 minutes at 190° C. and then for 30 minutes at 160° C. The product was a brown, waxy solid which thermoset to a dark-brown rubber in 4 minutes at 150° C. When mixed with 10% hexamethylenetetramine, the resin set to a dark brown rubber in 30 seconds at 150° C.

Example 20

A resin prepared as in Example 3 was ground to a fine powder and mixed with 10% of a conventional urea/formaldehyde condensation product which had been concentrated to 70% solids. The resin thermoset at 150° C. in 30 seconds to a fawn-coloured, rubbery solid.

When the urea/formaldehyde condensation product was replaced by a conventional phenol/formaldehyde resin adhesive the above resin thermoset at 150° C. in 1¼ minutes.

Example 21

A resin prepared as in Example 4 was mixed with 10% of a conventional urea/formaldehyde resin adhesive containing 70% solids. The resin thermoset to a grey rubbery solid on heating at 150° C. for 1¼ minutes. Without the addition of the urea/formaldehyde resin, the original product thermoset at 150° C. in 5¼ minutes.

Example 22

A reaction mixture was prepared as follows:

| | Parts |
|---|---|
| Commercial mixed dihydric phenols | 110 |
| Mixed phosponitrilic chlorides | 110 |

The materials were thoroughly mixed together and heated for 2 hours at 170 to 200° C. A dark brown viscous syrupy resin was obtained. This resin thermoset to a brown solid on heating at 150° C. for 3 minutes. When mixed with 10% hexamine the resin thermoset to a brown solid in 2½ minutes at 150° C. and in 8½ minutes at 100° C.

Example 23

The wide range of cross-linking agents which can be used to thermoset the new type of resins described above is illustrated in the table below. In each case the polyphosphonitrile chloride/resorcinol resin prepared as in Example 4, was mixed with 10% of the cross-linking agent and heated on a hot-plate at 150° C. until curing had taken place.

| Cross-linking agent | Time to thermoset |
|---|---|
| 1. None | no hardening after 10 minutes. |
| 2. Paraformaldehyde | 20 seconds. |
| 3. Trioxane | 15 seconds. |
| 4. Furfuraldehyde | 40 seconds. |
| 5. Metaldehyde | 4 minutes 30 seconds. |
| 6. Trishydroxymethyl phosphonyl chloride | 5 minutes 25 seconds. |
| 7. Tetrakis hydroxymethyl phosphine oxide | 1 minute 40 seconds. |

Example 24

A resin was prepared as in Example 8 and ground to a fine powder. The powdered resin was mixed with 25% of a 40% solution of formaldehyde in methanol. On heating at 150° C. for 40 seconds the resin thermoset to a soft rubbery solid.

Example 25

A resin was prepared as in Example 4, and mixed with 25% of a 40% (w./w.) solution of formaldehyde in methanol. On heating at 150° C. for 2½ minutes the resin set to a soft rubbery solid.

Example 26

A moulding composition was made as follows:

| | Parts |
|---|---|
| Resin from Example 8 | 30 |
| Fine asbestos fibre | 35 |

The materials were ground finely together with 6.5% powered hexamethylenetetramine calculated on the resin content. The powder was pressed in a steel mould at 145° C. for 15 minutes under a pressure of ½ ton/sq. inch. The resultant moulding was very hard and showed good mechanical strength.

Example 27

A moulding composition was made as follows:

| | Parts |
|---|---|
| Resin from Example 8 | 70 |
| Alumina white | 60 |

The materials were ground with hexamine and moulded as in Example 26. The product was very hard and had good mechanical strength.

Example 28

A moulding composition was made as follows:

| | Parts |
|---|---|
| Resin from Example 8 | 60 |
| Hexamine | 5 |
| Powdered graphite | 105 |

The materials were ground together and pressed in a steel disc mould at 145° C. for ½ hour under a pressure of 5 tons per sq. in. The composition showed good flow properties and the moulding was very hard with good mechanical properties. When heated in a flame to dull red heat the moulding did not swell, crack, or lose its mechanical strength appreciably.

Example 29

A moulding composition was made as follows:

| | Parts |
|---|---|
| Resin from Example 8 | 12 |
| Hexamethylenetetramine | 1 |
| Powdered mica | 21 |

The materials were ground together and pressed as in Example 28. A hard, grey moulding was obtained which when heated to dull red heat for 15 minutes in a flame did not blister or crack and which retained its mechanical strength.

Example 30

A moulding composition was made as follows:

| | Parts |
|---|---|
| Resin from Example 8 | 120 |
| Hexamethylenetetramine | 10 |
| Fine silica | 140 |

The materials were ground together and pressed for 45 minutes at 135° C. under a pressure of ¾ ton per sq. in. A hard, grey moulding was obtained which retained its mechanical strength on heating to dull red heat although small surface cracks appeared on the moulding.

Example 31

A moulding composition was made as follows:

| | Parts |
|---|---|
| Resin from Example 8 | 60 |
| Fine asbestos fibre | 70 |
| Hexamethylenetetramine | 5 |

The materials were ground together and pressed in a steel mould at 145° C. for ½ hour under a pressure of ½ ton per sq. in. The moulding obtained was hard and tough with self-extinguishing properties when held in a flame.

*Example 32*

A coating composition was made by dissolving the resin as prepared in Example 8 in ethyl alcohol to give a 30% solution. To this 30% solution was added 6.5% hexamethylenetetramine calculated on the resin content of the mixture. The resin solution was painted on steel, aluminium, copper and stainless steel strips and after air-drying at room temperature (20° C.) for 4 hours, the coated strips were heated for 2 hours at 135° C. and finally for 2 hours at 200° C. The coating showed good adhesion and heat resistance.

*Example 33*

A resin prepared as in Example 8 was made into a coating lacquer as follows:

| | Parts |
|---|---|
| Resin from Example 8 | 100 |
| Tricresyl phosphate | 20 |
| 40% formaldehyde (isobutanol sol.) | 25 |
| Methyl ethyl ketone | 200 |

The coating was applied by dipping to a number of metal strips (steel, copper, aluminum, tinned iron). The coated strips were dried for 2 hours at 80° C. and then baked for 2 hours at 135° C., followed by 2 hours at 200° C.

In each case the coating adhered well to the metals. The coating did not crack when the metal strips were bent round a ½" mandrel.

*Example 34*

A resin was prepared by heating together 110 parts of hydroquinone, 110 parts resorcinol, and 186 parts boric acid for 20 minutes at 145° C. and then for 2 hours at 210–220° C. 50 parts of the hard brown resin so produced was added to a solution of 50 parts mixed polyphosphonitrilic chlorides in 50 parts xylene. On heating to 145° C., a homogeneous solution was obtained. After 15 minutes the colour of the solution became dark-red and a gel separated from the solvent. On further heating at 145° C. for 45 minutes the amount of insoluble gel increased and the solvent became nearly colourless. Heating was then cut off, and the product was freed from solvent by vacuum evaporation.

A brown resinous crumb was obtained which thermoset on heating at 150° C. for 3 minutes to a hard powder.

When mixed with 10% hexamethylenetetramine and heated at 150° C. for 1 minute the resin set to a hard powder.

*Example 35*

| | Parts |
|---|---|
| Hydroquinone | 33 |
| Mixed polyphosphonitrilic chlorides | 26 |
| Phosphorus oxychloride | 7.7 |

The hydroquinone was added gradually to the mixture of mixed phosphonitrilic chlorides and phosphorus oxychloride at 100° C. and the mixture heated to 185° C. over a period of 70 minutes when the material gelled. The product was a hard resin when cold. This resin set to a hard powder when heated at 200° C. for 1½ minutes.

This resin when mixed with 10% of paraformaldehyde set to a black powder in 20 seconds at 200° C.

Similarly, the same resin when mixed with 10% hexamethylenetetramine cured to a brown-black powder in 35 seconds at 200° C.

*Example 36*

| | Parts |
|---|---|
| Hydroquinone | 33 |
| Phenol | 9.4 |
| Mixed polyphosphonitrilic chlorides | 23.2 |
| Phosphorus oxychloride | 15.4 |

The hydroquinone was added to the mixture of mixed polyphosphonitrilic chlorides and phosphorus oxychloride at 100° C. and the whole heated to 180° C. over a period of 40 minutes. The mixture was heated at 180–190° C. for a further 1¾ hours, when the material gelled. The product was a hard resin when cold. This resin set to a pinkish powder when heated at 200° C. for 2 minutes.

This resin when mixed with 10% of paraformaldehyde was cured to a light-brown powder in 30 seconds at 200° C.

Using 10% of hexamethylenetetramine in a similar way the resin gave a red-brown powder after 20 seconds at 200° C.

*Example 37*

50 parts of the hydroquinone resorcinol boric acid resin mentioned in Example 34 were heated together with 50 parts of mixed polyphosphonitrilic chlorides in a flask immersed in boiling water, for a period of one hour. A resin was formed which upon cooling was harder than the resin formed in Example 34 and which thermostat on heating at 150° C. for 2½ minutes and when mixed with 10% hexamethylenetetramine it thermoset to a hard powder in 1 minute at 150° C.

*Example 38*

| | Parts |
|---|---|
| Hydroquinone | 83 |
| Mixed polyphosphonitrilic chlorides | 110 |
| n-Butanol | 37 |

The hydroquinone was added to the mixture of polyphosphonitrilic chlorides and butanol previously heated to 100° C. The temperature of the mixture was then raised to between 120° and 130° C. and heating continued under reflux conditions over a period of two hours. At the end of this time, a yellow crumbly resin was obtained which thermoset to a brown rubbery solid on heating at 150° C. for 3 minutes. When the resin was mixed with 10% hexamethylenetetramine it thermoset on heating at 150° C. in one half minute.

40 parts of the resin prepared as above was mixed with 70 parts by weight of fine asbestos fibre and 4 parts of hexamethylenetetramine. The mixture was moulded at 145° C. at a pressure of ½ ton per sq. in. for 10 minutes, giving a hard tough moulding.

*Example 39*

| | Parts |
|---|---|
| Hydroquinone | 83 |
| Mixed polyphosphonitrilic chlorides | 110 |
| Iso-butanol | 37 |
| Xylene | 110 |

The hydroquinone was added to the mixture of polyphosphonitrilic chlorides, isobutanol and xylene previously heated to 100° C. The reaction temperature was raised to 145° C. and maintained at this temperature for 1½ hours under reflux conditions. The xylene was then removed by vacuum evaporation leaving a brown crumbly resin.

The resin thermoset to a dark rubbery solid on heating at 150° C. for 3 minutes. When mixed with 10% hexamethylenetetramine the resin thermoset to a dark rubbery solid when heated at 150° C. for one minute.

60 parts of the resin prepared as above was mixed with 70 parts of a fine amorphous silica powder and 6 parts of hexamethylenetetramine. The mixture was moulded under a pressure of 1 ton per sq. in. at 145° C. for 15 minutes, giving a hard strong moulding.

The products of the present invention have remarkably high thermal stability and are eminently suitable for use in the production of articles which have to withstand high temperatures. The products of the present invention can be used in the manufacture of moulded articles, laminates, frictional materials, abrasive elements, surface-coating and impregnating compositions, bonding agents and adhesives. They may also be used for fire proofing because of their outstanding resistance to burning.

It will be appreciated that the present invention is not concerned with the manufacture of the polyphosphonitrilic chlorides themselves but with their modification.

I claim:

1. A process for the production of modified inorganic polymeric substances which comprises heating a polyphosphonitrilic chloride under substantially anhydrous conditions with a polyhydroxy aromatic compound, the molar ratio of said polyphosphonitrilic chloride to the polyhydroxy aromatic compound being within the range of from about 2:1 to about 1:1.

2. A process for the production of modified inorganic polymeric substances which comprises heating a polyphosphonitrilic chloride under substantially anhydrous conditions with a partial ester with boric acid of a polyhydroxy aromatic compound, which partial ester molecule contains free phenolic hydroxy groups and the molar ratio of said polyphosphonitrilic chloride to the polyhydroxy aromatic compound being within the range of from about 2:1 to about 1:1.

3. A process according to claim 1 wherein the polyphosphonitrilic chloride is reacted with more than 75% of its weight of a dihydroxy benzene.

4. A process according to claim 3 wherein the polyphosphonitrilic chloride is reacted with at least an equal weight of the dihydroxy benzene.

5. A process according to claim 1 wherein the modified polymer is hardened by continued heating to complete the reaction.

6. A process according to claim 4 wherein the modified polymer is reacted with reactive aldehyde.

7. A process according to claim 6 wherein said aldehyde is a lower aliphatic aldehyde containing not more than four carbon atoms.

8. A process according to claim 7 wherein formaldehyde is employed.

9. A process according to claim 1 wherein the polyphosphonitrilic chloride is reacted with less than 75% of its weight of a dihydroxy benzene.

10. A process according to claim 9 wherein the amount of the dihydroxy benzene is more than 50% by weight of the polymer.

11. A process according to claim 10, wherein another polyhydroxy compound is used in place of the dihydroxy benzene in an amount such that the amount of hydroxy groups is the same as afforded by the dihydroxy benzene.

12. A process according to claim 1 wherein the reaction is carried out in the presence of an organic solvent for the reactants.

13. A process according to claim 1 wherein the polyphosphonitrilic chloride is the crystalline polymeric form thereof.

14. A process for the production of modified inorganic polymeric substances which comprises heating a polyphosphonitrilic chloride under substantially anhydrous conditions with a partial ester with a polyfunctional ester-forming phosphorus compound, selected from the group consisting of inorganic phosphoric acids, polyfunctional chlorine derivatives of inorganic phosphoric acids and phosphorus trichloride, of a polyhydroxy aromatic compound, which partial ester molecule contains free phenolic hydroxy groups and the molar ratio of said polyphosphonitrilic chloride to the polyhydroxy aromatic compound being within the range of from about 2:1 to about 1:1.

15. A process according to claim 4 wherein the modified polymer is heated with a compound which is decomposable under the influence of heat to yield a lower aliphatic aldehyde.

16. A process according to claim 4 wherein the modified polymer is heated with a polymer of formaldehyde.

17. A process according to claim 4 wherein the modified polymer is heated with hexamethylenetetramine.

18. A process according to claim 1 wherein the polyphosphonitrilic chloride is the oily polymer form thereof.

19. A process for the production of modified inorganic polymeric substances which comprises heating a polyphosphonitrilic chloride under substantially anhydrous conditions with a polyhydroxy aromatic compound in admixture with a minor proportion of a mono-hydroxy aromatic compound, the molar ratio of said polyphosphonitrilic chloride to the polyhydroxy aromatic compound to the mono-hydroxy aromatic compound being within the range of from about 1:1:1 to about 2:3:1.

References Cited in the file of this patent

UNITED STATES PATENTS

| | | |
|---|---|---|
| 2,192,921 | Lipkin | Mar. 12, 1940 |
| 2,214,769 | Lipkin | Sept. 17, 1940 |
| 2,330,286 | Honel | Sept. 28, 1943 |
| 2,636,017 | Schwartzberg | Apr. 21, 1953 |